(12) United States Patent
Wölfing et al.

(10) Patent No.: US 9,605,825 B2
(45) Date of Patent: Mar. 28, 2017

(54) FIBER-OPTIC CONVERSION MODULE

(71) Applicant: SCHOTT AG, Mainz (DE)

(72) Inventors: Bernd Wölfing, Mainz (DE); Volker Hagemann, Klein-Winternheim (DE); Jürgen Meinl, Hohenstein-Holzhausen (DE); Hubertus Russert, Heidenrod (DE); Thomas Reichert, Wackernheim (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 14/670,012

(22) Filed: Mar. 26, 2015

(65) Prior Publication Data

US 2015/0292699 A1 Oct. 15, 2015

Related U.S. Application Data

(63) Continuation of application No. PCT/EP2013/070074, filed on Sep. 26, 2013.
(Continued)

(30) Foreign Application Priority Data

Sep. 26, 2012 (DE) .......................... 10 2012 109 088

(51) Int. Cl.
*F21V 11/00* (2015.01)
*F21S 8/10* (2006.01)
(Continued)

(52) U.S. Cl.
CPC ........... *F21S 48/1104* (2013.01); *B60Q 11/00* (2013.01); *F21S 48/11* (2013.01);
(Continued)

(58) Field of Classification Search
CPC ........ F21S 48/12; F21S 48/17; F21S 48/1241; F21S 48/32; F21S 48/328; F21Y 2181/025;
(Continued)

(56) References Cited

U.S. PATENT DOCUMENTS 7,794,132 B2 * 9/2010 Cunius ...................... F21S 4/20
174/110 R
2006/0279950 A1 * 12/2006 Hama .................. A61B 1/0653
362/257
(Continued)

FOREIGN PATENT DOCUMENTS

DE         10217627  A1   11/2002
DE       102004038321 A1   6/2005
(Continued)

OTHER PUBLICATIONS

International Search Report dated Apr. 7, 2014 from corresponding PCT/EP2013/070074 with English translation, 8 Pages
(Continued)

*Primary Examiner* — Ali Alavi
(74) *Attorney, Agent, or Firm* — Ohlandt, Greeley, Ruggiero & Perle, LLP

(57) ABSTRACT

A fiber-optic conversion module is provided as part of a lighting device on a vehicle. The module includes optical fibers with connectors, a light exit head, and a converter mounted on a cooling element. Shorter wavelength excitation light is fed to the optical fibers that emit the excitation light towards the converter arranged at an angle relative to the beam direction, at a light spot that remits useful light in a radiation angle in form of a cone of useful light and reflects excitation light as a Fresnel reflection substantially outside the cone of useful light, where Fresnel reflection is made harmless by a light stop.

15 Claims, 13 Drawing Sheets

Related U.S. Application Data

(60) Provisional application No. 61/706,131, filed on Sep. 27, 2012.

(51) Int. Cl.
*F21V 8/00* (2006.01)
*B60Q 11/00* (2006.01)
*F21Y 101/00* (2016.01)
*F21Y 115/30* (2016.01)

(52) U.S. Cl.
CPC ....... *F21S 48/1145* (2013.01); *F21S 48/1225* (2013.01); *F21S 48/1241* (2013.01); *F21S 48/31* (2013.01); *F21S 48/328* (2013.01); *G02B 6/0006* (2013.01); *G02B 6/0008* (2013.01); *F21Y 2101/00* (2013.01); *F21Y 2115/30* (2016.08)

(58) Field of Classification Search
CPC .. G02B 6/0005; G02B 6/0006; G02B 6/0008; G02B 6/04; G02B 6/10; G02B 6/24
USPC .......................................................... 362/510
See application file for complete search history.

(56) References Cited

U.S. PATENT DOCUMENTS

| | | |
|---|---|---|
| 2008/0075406 A1 | 3/2008 | Kadomi et al. |
| 2010/0254153 A1 | 10/2010 | Hama et al. |
| 2011/0031227 A1* | 2/2011 | Gangl ................ B23K 26/0648 219/121.68 |
| 2011/0148280 A1 | 6/2011 | Kishimoto et al. |
| 2011/0273892 A1* | 11/2011 | Mostoller ............... F21V 17/06 362/311.01 |
| 2011/0279007 A1 | 11/2011 | Kishimoto |
| 2011/0279039 A1* | 11/2011 | Kishimoto ......... H05B 33/0857 315/113 |
| 2011/0280033 A1* | 11/2011 | Kishimoto ........... F21S 48/1145 362/543 |
| 2012/0057364 A1 | 3/2012 | Kishimoto et al. |
| 2012/0069593 A1 | 3/2012 | Kishimoto et al. |
| 2012/0106178 A1 | 5/2012 | Takahashi et al. |
| 2012/0106183 A1 | 5/2012 | Takahashi |
| 2012/0106188 A1 | 5/2012 | Takahashi et al. |
| 2012/0140501 A1 | 6/2012 | Nakazato et al. |
| 2012/0163009 A1 | 6/2012 | Nakazato et al. |

FOREIGN PATENT DOCUMENTS

| | | |
|---|---|---|
| DE | 102006029203 A1 | 12/2007 |
| DE | 102010034054 A1 | 2/2012 |
| JP | 2012059452 A | 3/2012 |
| JP | 2012190555 A | 10/2012 |
| WO | 2008000208 A1 | 1/2008 |
| WO | 2013139621 A1 | 9/2013 |
| WO | 2013139675 A1 | 9/2013 |
| WO | 2013160456 A1 | 10/2013 |

OTHER PUBLICATIONS

English translation of the Written Opinion of the International Searching Authority dated Apr. 7, 2014 from corresponding PCT/EP2013/070074, 11 Pages.

* cited by examiner

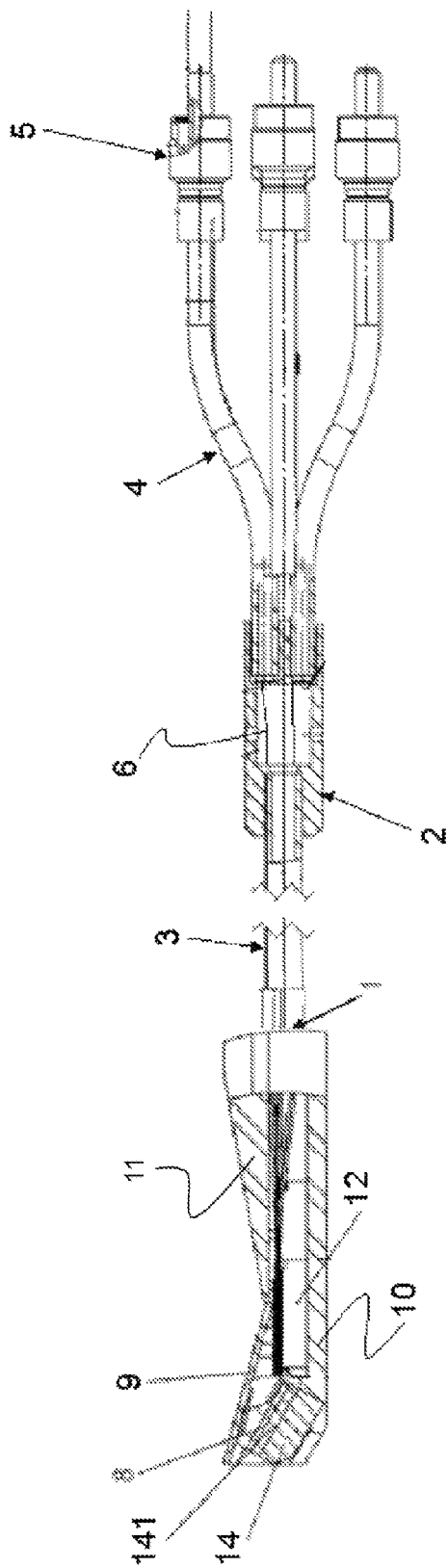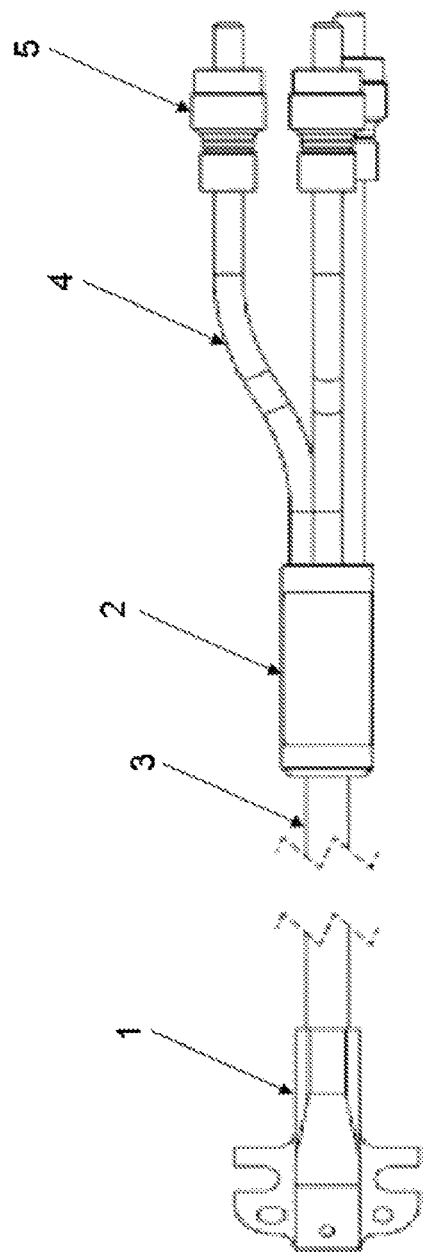

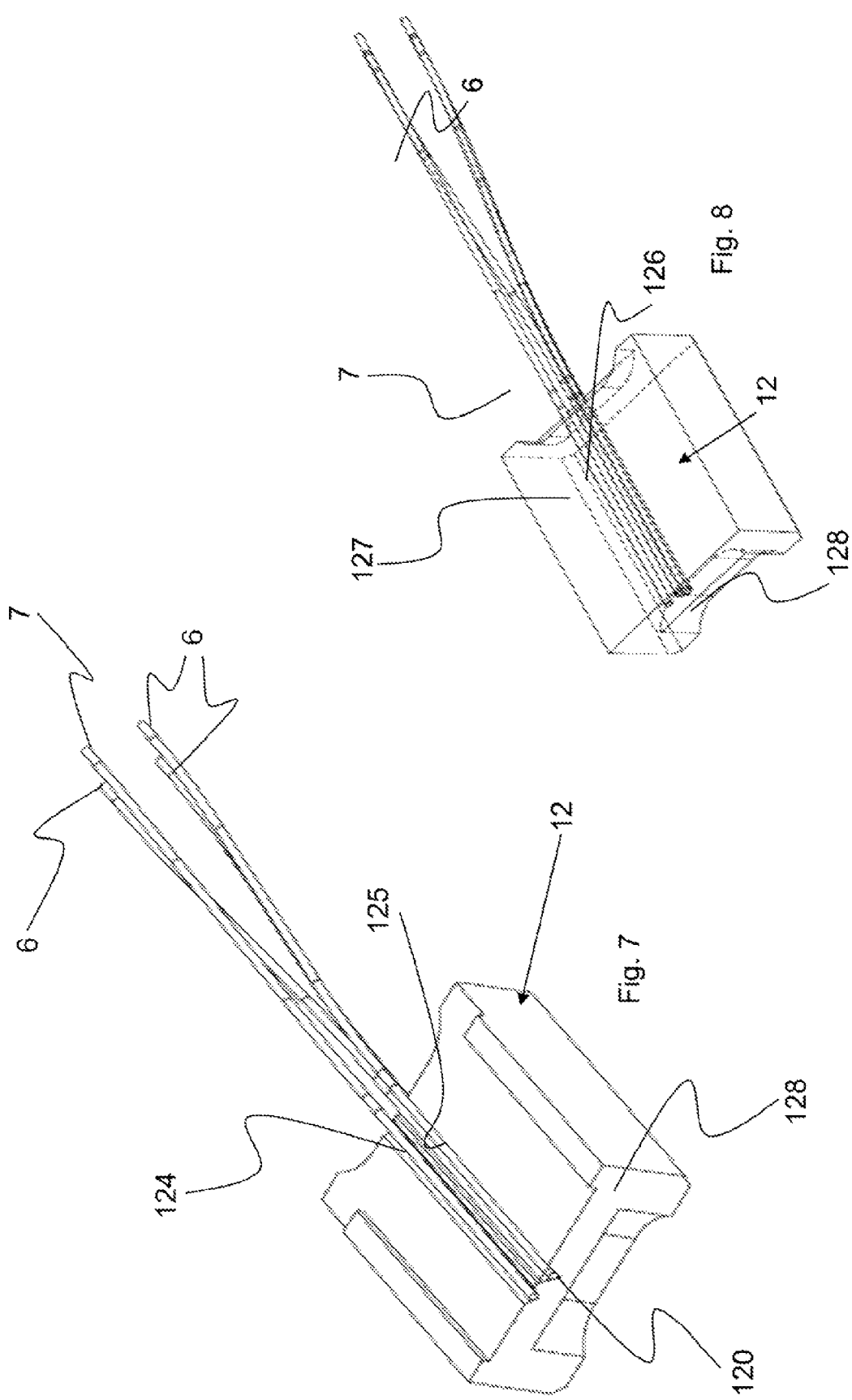

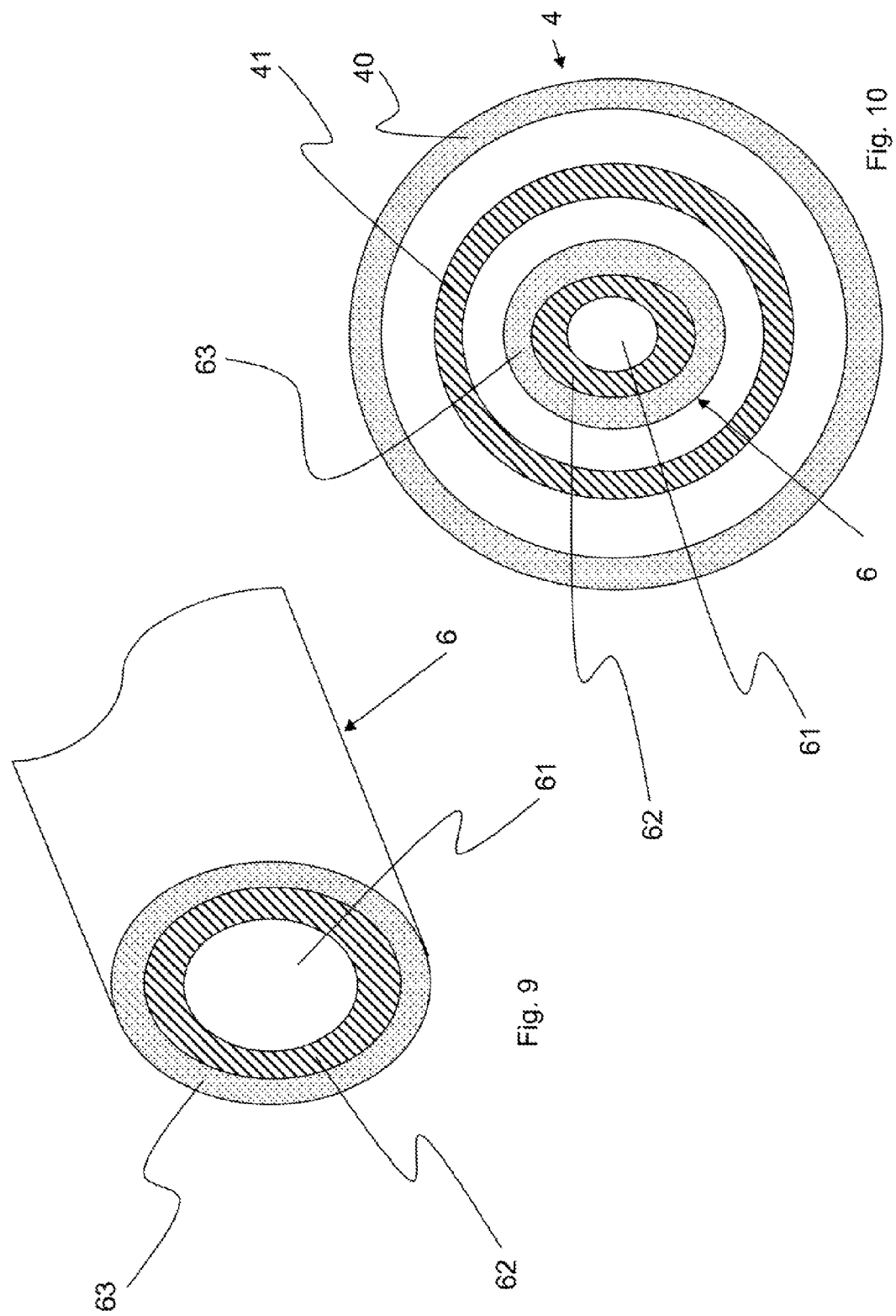

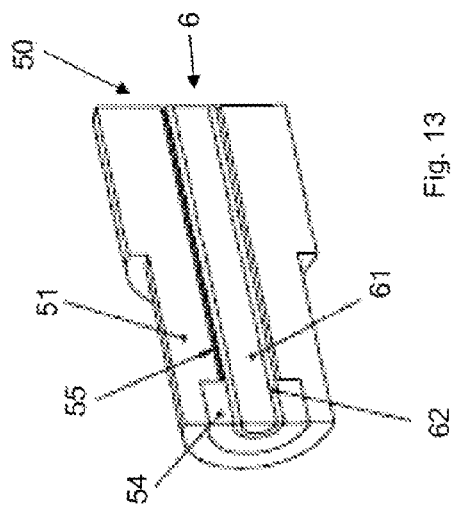
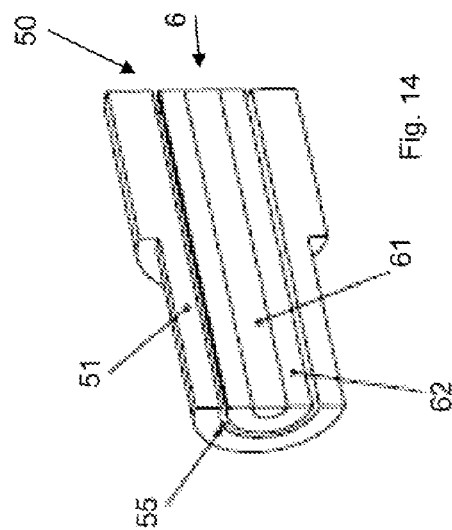
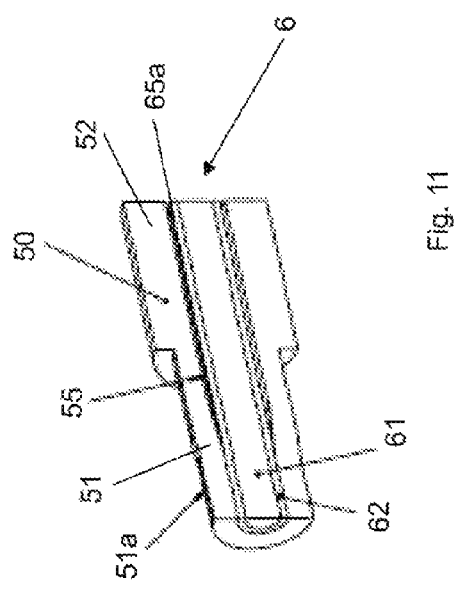
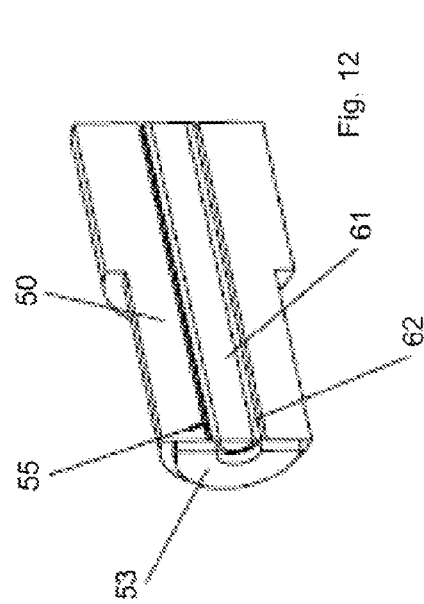

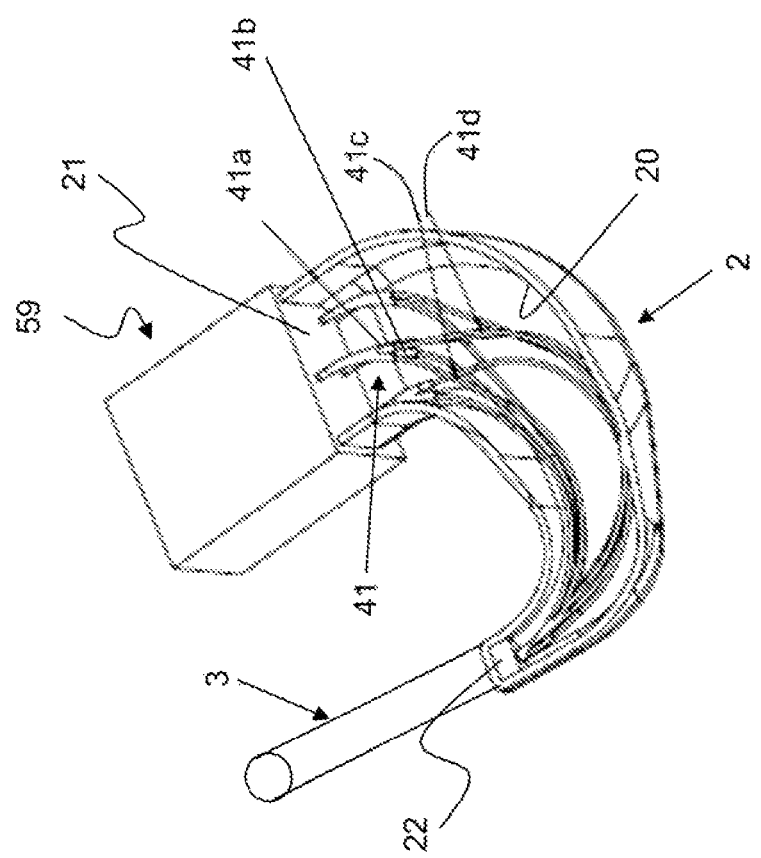

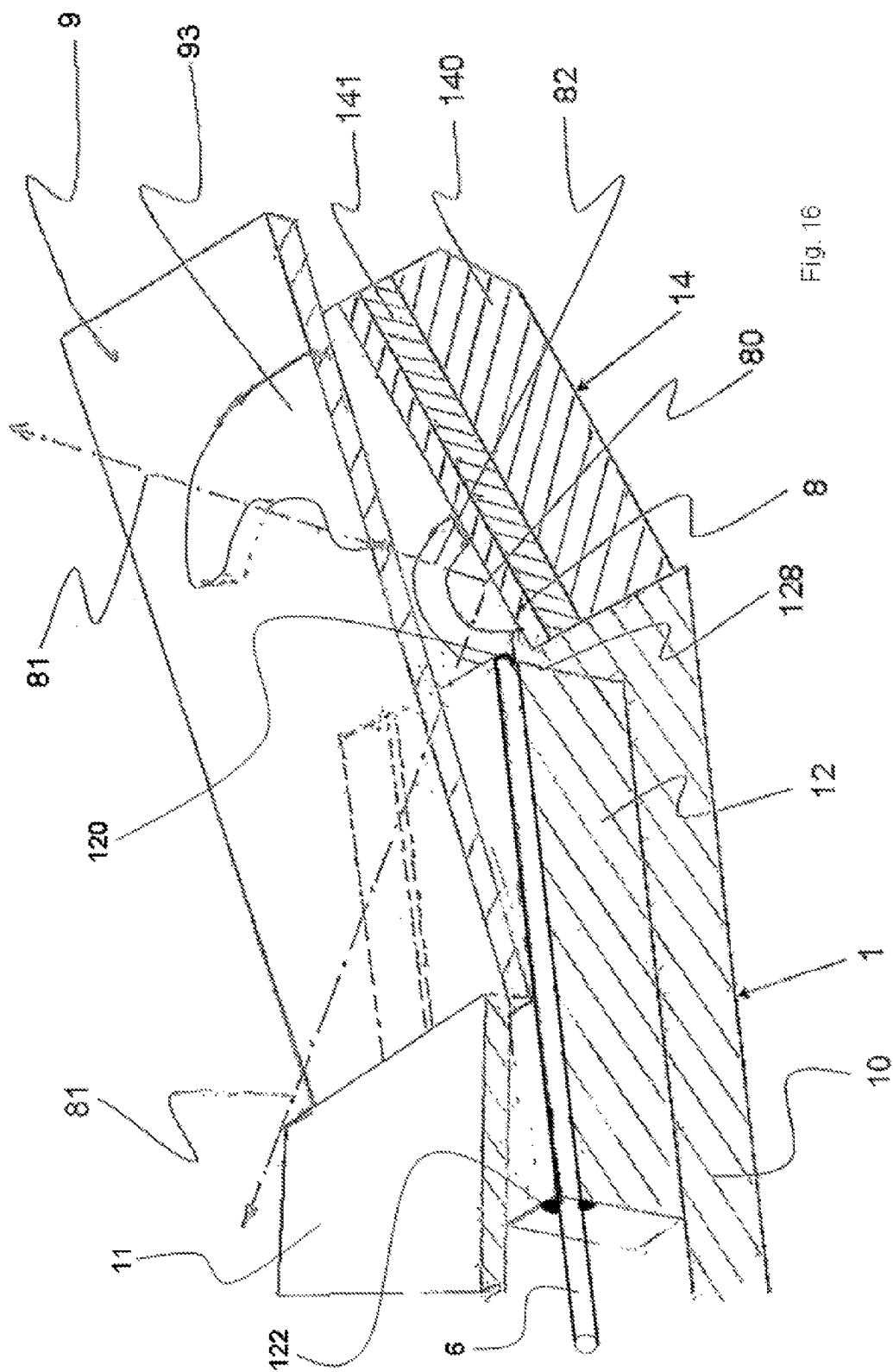

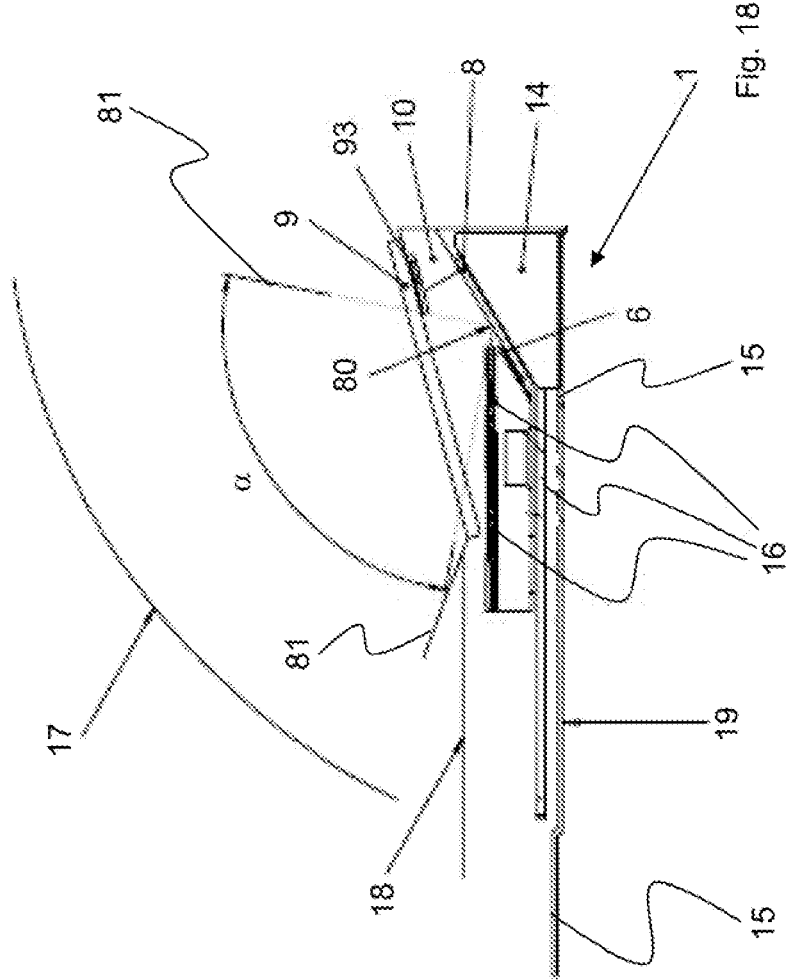

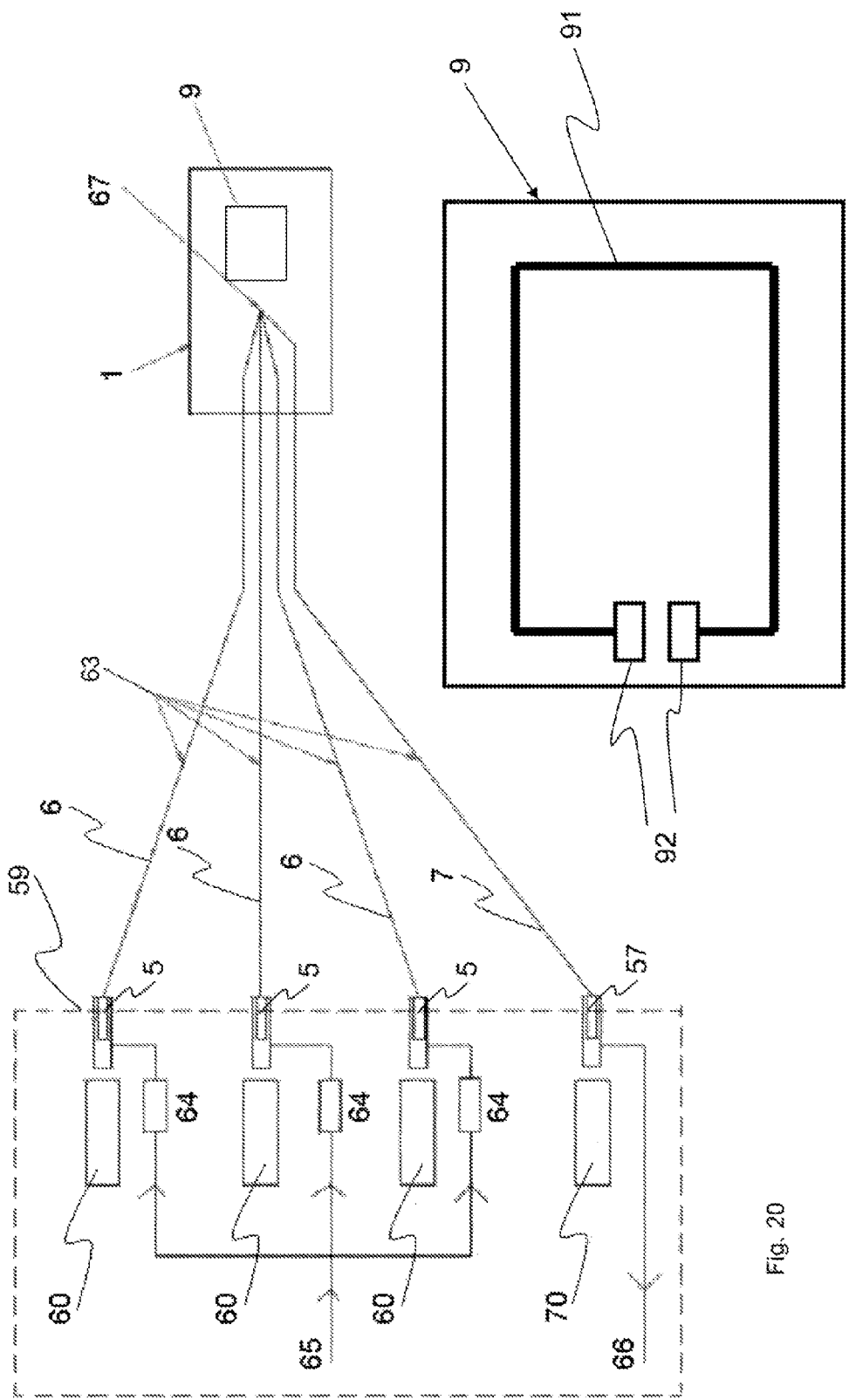

FIBER-OPTIC CONVERSION MODULE

CROSS REFERENCE TO RELATED APPLICATIONS

This application is a continuation of International Application No. PCT/EP2013/070074 filed on 26 Sep. 2013, which claims the benefit of U.S. Provisional Application Ser. No. 61/706,131 filed 27 Sep. 2012 and claims benefit under 35 U.S.C. §119(a) of German Patent Application No. 10 2012 109 088.2 filed 26 Sep. 2012.

BACKGROUND

1. Field of the Invention

The invention relates to a fiber-optic conversion module as part of a lighting device on a vehicle, in particular as part of a headlight.

2. Description of Related Art

A light emitting device as part of a headlight is known from WO2008000208A1 (DE 10 2006 029 203 A1) and comprises an excitation light source and coupled thereto an optical fiber and downstream thereof a converter material for converting the excitation light of shorter wavelengths into useful light of an on average longer wavelength having an appearance of white light. The useful light, in this case, is composed of a longer wavelength fraction of converted light and an unconverted fraction of the excitation light. In detail, a plug-in connection to a transparent body, a converter in transmission mode, and an optical component for emitting the converted useful light in a preferred direction are provided. A cooling element for the converter is not provided. When in such a light emitting device an optical fiber becomes damaged, this may lead to dangerous situations in case lasers are used as the excitation light sources. Therefore, the light emitting device is provided with additional detection means for detecting damage to the one or more optical fibers and, if necessary, to shut off the power supply to the excitation light source. The detection means may be provided on the light input end for excitation light to receive light fed back from the converter, which indicates that the optical fiber is operational and intact. Another method of failure detection is to check for current flow in a network of wires including one or more wires running through the cladding regions of the one or more optical fiber(s). When an optical fiber breaks, the co-extending wire should also break, which would cause an interruption of current flow and lead to failure detection. In the event of a failure, the radiation source is shut off. The light emitting device has a configuration such that the conversion material only works in transmission. Cooling of the converter material is very difficult to accomplish in this case. However, effective cooling is indispensable because of the heat produced during conversion.

From DE 10 2010 034 054 A1 a laser-based white light source is known, in which a laser produces a light spot in a converter by means of a converging lens, for delivering white useful light in a transmission mode. In order to avoid high temperatures at the light spot, the converter is produced using thermally conductive material and is additionally cooled by air and/or is rotated to cause the light spot to move around in the converter material.

The use of a plurality of optical fibers adjacent to each other in a light emitting device that includes a converter in transmission mode is known from US 2010/0254153 A1.

US 2008/0075406 A1 discloses an optical component comprising a converter, an optical fiber leading thereto, a holding member for the optical fiber, and a cap for securing the converter to the holding member. The cap and the holding member are made of a material of high thermal conductivity for preferably removing heat from the converter which is operated in transmission.

Light emitting devices for headlights, in part also in remission mode, are known from US 2011/0148280 A1, US 2011/0279007 A1, US 2011/0280033 A1, US 2012/0106178 A1, US 2012/0106183 A1, and US 2012/0069593 A1. Here, the converter material is arranged in form of a block in the focus of the parabolic headlight mirror, with a transparent plate extending transversely through the parabolic mirror for fixing the converter (US 2011/0148280 A1, US 2011/0279007 A1, US 2011/0280033 A1, US 2012/0069593 A1), or a support wall is formed along the axis of the parabolic mirror, to which the converter is mounted (US 2012/0106178 A1, US 2012/0106183 A1). A fiber-optic conversion module provided with connectors for injecting light at one end and with a light exit window for emitting useful light at the other end and mountable as a whole in a working unit, for example a parabolic mirror, is not specified in the cited documents.

SUMMARY

An object of the invention is to provide a fiber-optic conversion module which is suitable as a subassembly in a lighting device between an excitation light source and a headlight for delivering useful light and which provides for good heat dissipation.

Another object is to improve beam safety when using laser light in lighting devices.

In this context, a fiber-optic conversion module is to be created that prevents dangerous excitation light from exiting when lasers or laser diodes are used as light sources, even if the car headlight is destroyed, as happens in car accidents, and optical fibers that lead into the headlight are broken.

Another object of the inventors is to provide a fiber-optic conversion module which forms part of a failure detection means which is able to detect fractures in optical fibers and to cause a shut-off of the excitation light source.

The fiber-optic conversion module according to the invention comprises at least one optical fiber, a light exit head, a converter, a cooling element, and a light exit window. The optical fiber has a light input end provided with a connector for being connected to an associated excitation light source. The light exit head ensures that the light exit end of the optical fiber directs the excitation light onto a light spot that is located on the surface of the converter. The shorter wavelength excitation light mostly enters into the converter where it is converted into longer wavelength converted light which is emitted together with scattered excitation light into a useful radiation angle, as useful light, while disturbing reflected excitation light (the so-called Fresnel reflection) is trapped by a light stop and is made harmless. In the case of a car headlight, the useful light is delivered to a parabolic mirror. The fiber-optic conversion module may as well comprise a plurality of optical fibers.

Furthermore, a supporting case may be formed by the light exit head and a manifold housing and may serve to support the at least one optical fiber. In case a plurality of optical fibers are provided, the light exit head ensures that the respective light exit ends of the optical fibers direct the excitation light onto a light spot. The supporting case is configured so that heat produced in the converter can be discharged and dissipated through the supporting case.

Optical fiber connectors have a spatial radial dimension that is greater than that of the optical fibers, and the same applies to excitation light sources, e.g. laser diodes. Accordingly, at the light input end the supporting case of the fiber-optic conversion module will have a minimum width which is considerably greater than the width of the light spot to be produced on the converter. Therefore, if a plurality of optical fibers are provided, the optical fibers fed with excitation light must be brought together, and for this purpose the manifold housing is used to bundle the optical fibers that extend from the connectors to the respective light exit ends.

For optically monitoring the converter, a further optical fiber may be provided in addition to the optical fibers carrying the excitation light, which further optical fiber extends substantially in parallel to the excitation light optical fibers and feeds back converted light that is relayed via a connector to a photodetector, for monitoring purposes. The photodetector is part of monitoring means for monitoring the operability of the lighting device. If during operation of the excitation light sources, one or more optical fibers break, the brightness of the light spot on the converter will decrease or the light spot will disappear, which will be detected by the photodetector, whereupon the excitation light sources are switched off.

A breakage of optical fibers may as well be detected electrically. For this purpose, the optical fibers are provided with an electrically conductive coating, and in case a plurality of optical fibers are provided they are insulated from each other but electrically connected together at a node close to the light exit ends. So a breakage in any optical fiber will cause an interruption of the electrical circuit path which can be detected by a lack of current or a decreasing current in detection means and is used for switching off the excitation light sources.

The means for detecting electrical failure may as well comprise a frangible conductive path on an exit window for useful light of the light exit head. When the exit window for useful light undergoes damage, the conductive path thereon will be interrupted which leads to error detection as described.

In order to prevent the excitation light (laser light) from escaping even if optical fibers should break, metallic protective tubes are provided in one embodiment of the invention. Such metallic protective tubes extend from the respective connector to the manifold housing, each one accommodating an individual optical fiber, while a shared metallic protective tube extends from the manifold housing to the light exit head to enclose the combined optical fibers. In another embodiment of the invention, a crescent-shaped manifold housing is provided in which the optical fibers extent in a curve within tubes in order to provide for a compensation in length. A compensation in length may be necessary to compensate for effects of the different thermal expansion of the optical fibers and the metallic protective tubes. A compensation in length may moreover be necessary due to a bend, expansion, or compression of the protective tubes. Such bends may occur when installing the conversion module, or even in operation if the headlight is configured so that it can move relative to the excitation light source. If only a single optical fiber is provided, the metallic protective tube may as well extend between the connector and the light exit head. Such metallic tubes are capable to resist intense laser light without being damaged, at least for a short time, and thus to prevent laser light from escaping if optical fibers in the conversion module should break due to an accident.

When the fiber-optic conversion module is employed in a car headlight, the optical fibers will experience heavy vibration stress. For this reason, an insulating plastic tube is provided as an inner protective tube in the metallic protective tube, which plastic tube surrounds the optical fibers and thereby prevents them from striking against the inner wall of the outer protective tube. In addition, the optical fiber is better protected from environmental factors such as humidity.

For guiding and supporting the optical fibers within the light exit head, different measures may be taken. The optical fibers may be supported in V-shaped grooves between a lower part and an upper part of the light exit head. It is also possible to support a plurality of the optical fibers in a larger V-shaped groove. Instead of grooves, bores in the light exit head may be used for guiding and holding the optical fibers. Appropriately, the light exit head includes an insert part, in which the optical fibers are supported and guided to the optical fiber concentration point of the light exit head.

Feeding of the excitation light to the converter may as well be accomplished via a focusing optical element. This may be a rod lens, a spherical lens, or an aspherical lens. A rod lens may have a flat ground light input end for excitation light and a lens-shaped light exit end, also for excitation light. The focusing optical element enables to focus divergent light from the optical fibers onto the converter. This allows to increase the spacing between the light exit end of the optical fiber and the converter.

In a preferred embodiment of the invention, the light exit head has a housing step at the light exit end of the optical fibers, which step faces an inclined surface of the converter.

The converter may be backed up with a mirror and may be provided with a light stop to trap a margin of converted yellow light that is excessive for the generation of white light.

The excitation light that is incident onto the converter as a beam of rays is partially reflected at the surface thereof as a main reflection, called Fresnel reflection, and this largely monochromatic reflected excitation light is a safety hazard when it penetrates to the outside. Therefore, it is intercepted by a beam trap comprising a light stop attached to the light exit head at a distance from the converter.

If polarized light is used, such as laser light, the unwanted Fresnel reflection can be reduced by orienting the polarization in parallel to the reflecting surface. Light polarized in parallel is reflected less, over the entire angular range, than light polarized vertically. If the angle of incidence is close to the polarization angle, the so-called Brewster's angle, reflectivity becomes almost zero. Since with short lengths of the fiber, such as in a range from 30 to 50 cm, the polarization of the laser light is largely maintained within the fiber, this property of the light may be used in a fiber-coupled device as presently provided in order to reduce Fresnel reflection.

BRIEF DESCRIPTION OF THE DRAWINGS

Embodiments of the invention will now be described with reference to the drawings. In the drawings:

FIG. 1 is a partially sectional view of a fiber-optic conversion module;

FIG. 2 is a top plan view of the conversion module;

FIG. 7 shows a third exemplary embodiment of an insert in the light exit head;

FIG. 8 shows a fourth exemplary embodiment of an insert in the light exit head;

FIG. 9 illustrates the configuration of an optical fiber;

FIG. 10 is a sectional view through a cable including an optical fiber;

FIG. 11 shows a first embodiment of a ferrule;

FIG. 12 shows a second embodiment of a ferrule;

FIG. 13 shows a third embodiment of a ferrule;

FIG. 14 shows a fourth embodiment of a ferrule;

FIG. 15 shows a manifold housing;

FIG. 16 is a schematic sectional perspective view of details of the light exit head;

FIG. 18 is a longitudinal sectional view through the light exit head of FIG. 17;

FIG. 19 shows a cover sheet on the light exit head;

FIG. 20 illustrates a fiber breakage monitoring circuit; and

DETAILED DESCRIPTION

Figure 3:
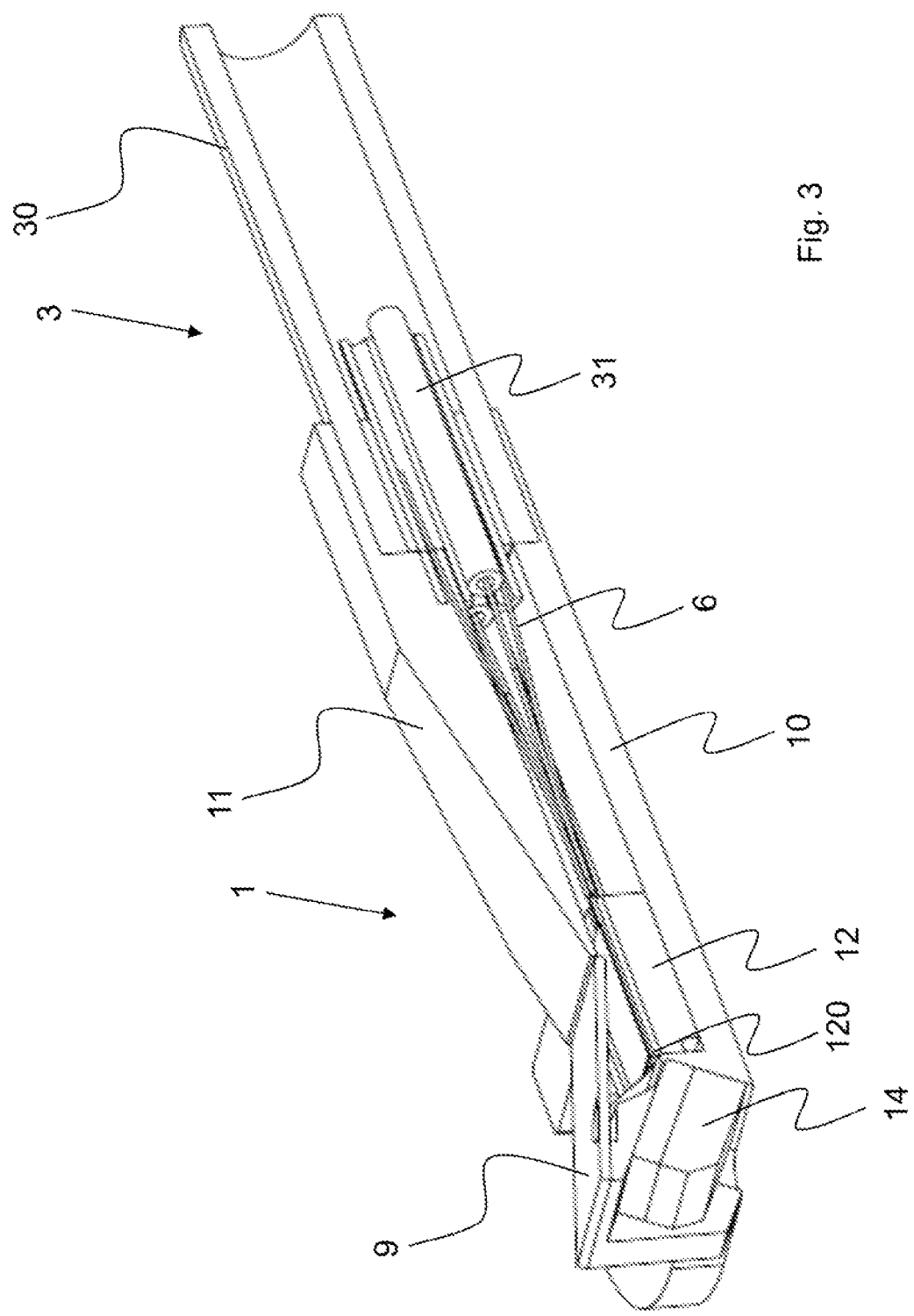
FIG. 3 is a longitudinal sectional view through a light exit head.

The fiber-optic conversion module as a whole is shown in FIGS. 1 and 2 for an embodiment with three optical fibers 6, comprising a light exit head 1, a manifold housing 2, a connecting cable 3 between the manifold housing and the light exit head, and three feed cables 4 each one provided with an SMA connector 5. FIG. 1 illustrates the light exit head 1 in a partially magnified and sectional view. Light exit head 1 and manifold housing 2 define a supporting case for the optical fibers 6 in their converged state. The three optical fibers 6 which have a light input end at the SMA connectors 5 and a light exit end in light exit head 1 extend within the conversion module. SMA connectors 5 are adapted to be coupled to individual laser diodes 60 (FIGS. 20, 21) which inject their excitation light into the individual optical fibers 6. Both the laser diodes 60 and the connectors 5 require a radial spacing relative to the optical fibers 6, i.e. they cannot be packed as close to one another as the optical fibers. Therefore, at the light input end the conversion module has larger space requirements than in the region of manifold housing 2 or light exit head 1. Therefore, for converging the optical fibers 6 without producing sharp bends, some curvature in the optical fibers is necessary between the light input end at connectors 5 and the light exit end within light exit head 1, if two or more optical fibers 6 fed by laser diodes are used next to each other.

The excitation light exiting from optical fibers 6 is incident in an angle on a converter 8 which converts the shorter wavelength excitation light into longer wavelength converted light and additionally scatters excitation light, so that the remitted light, on average, is useful light of longer wavelengths. As to the useful light, usually a white light character is desired. The useful light passes through a cover sheet 9 to the working unit part which in the case of headlights is a parabolic mirror, a segment of a parabolic mirror, or a modified parabolic mirror surface. If the headlight is intended for generating substantially parallel useful light, a small light spot 80 (FIGS. 16, 18) is produced on converter 8.

FIG. 3 is a perspective longitudinal sectional view through a light exit head 1 which comprises a lower part 10 with good heat conduction, an upper part 11, and an insert 12. The connecting cable 3 to manifold housing 2 has a metallic protective tube 30 which is glued into light exit head 1 in a manner so as to be at least dustproof, preferably resistant to pressurized water. The optical fibers 6 extending inside protective tube 30 are additionally protected by plastic tubes 31. After leaving plastic tubes 31, optical fibers 6 converge towards insert 12, with certain curvatures, and towards an optical fiber concentration point 120 on insert 12.

Figure 4:
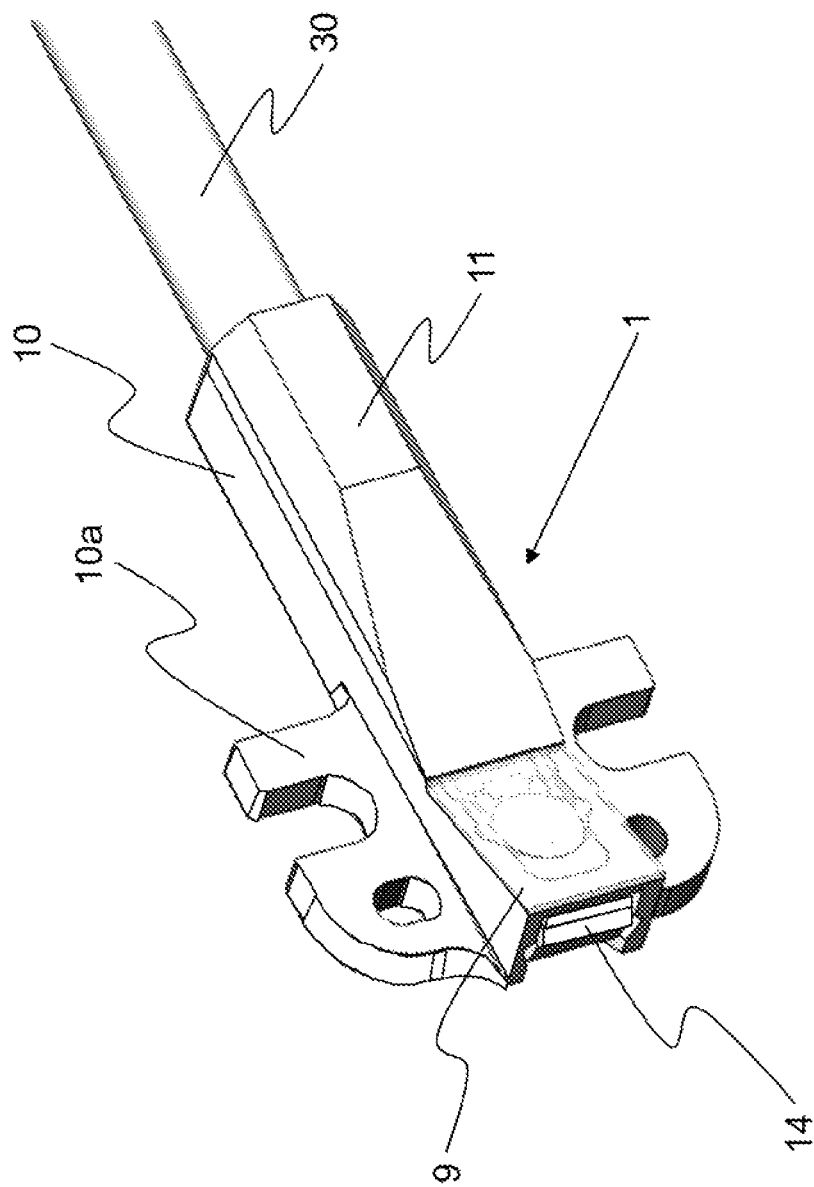
FIG. 4 is a perspective view of a light exit head.

FIG. 4 is a perspective view of light exit head 1, which includes a mounting flange 10a at the lower part 10.

Figure 5:
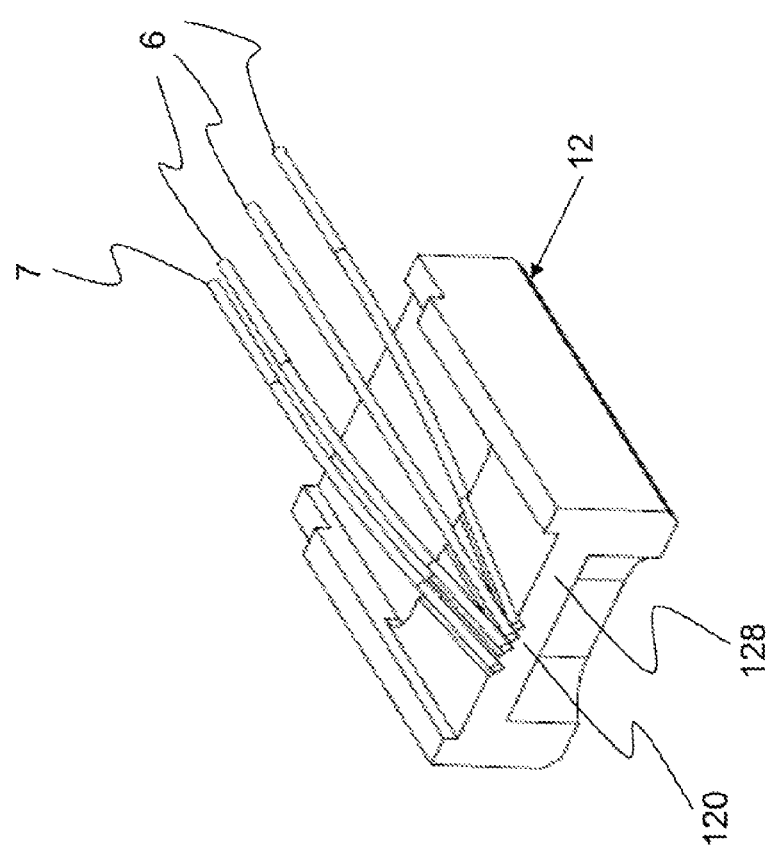
FIG. 5 shows a first exemplary embodiment of an insert in the light exit head.

FIG. 5 shows a first embodiment of an insert 12. For supporting optical fibers 6, three V-shaped grooves 121, 122, and 123 are provided, which lead to the optical fiber concentration point 120, with outer grooves 121 and 123 extending in a slight curve. A further groove 124 which can be used for supporting a further, feed-back optical fiber 7 extends in parallel to groove 123.

Figure 6:
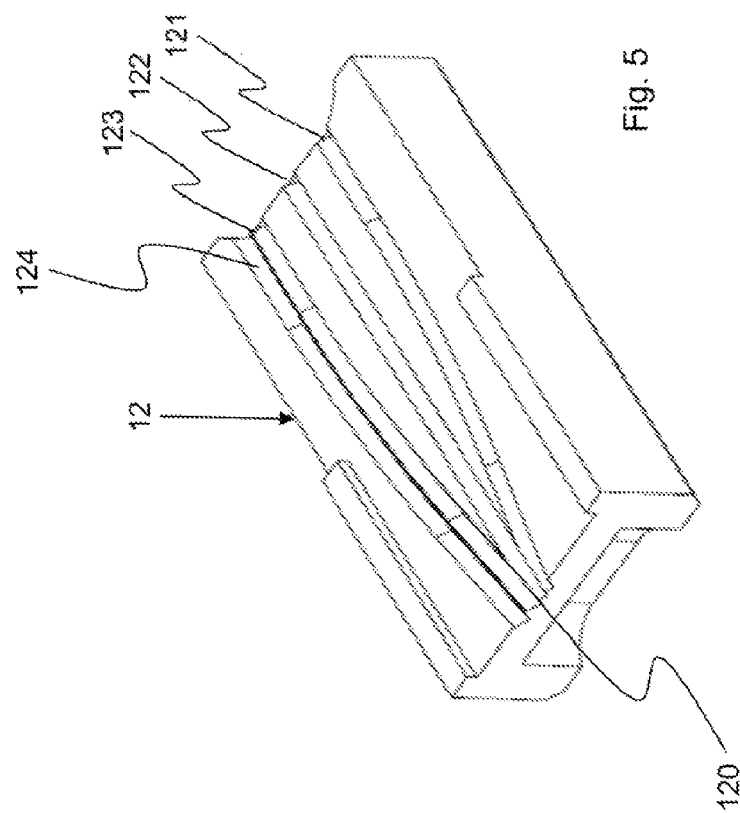
FIG. 6 shows a second exemplary embodiment of an insert in the light exit head.

FIG. 6 shows the guidance and support of the excitation light carrying optical fibers 6 and of feed-back optical fiber 7 in an insert 12 which is slightly modified as compared to FIG. 5.

The fibers are polished to be flush with the light exit face. Therefore, the optical fiber end face of the inclined optical fibers extends in an angle to the axis of the optical fibers, resulting in refraction of the exiting light. Thus, the angles of the grooves can be reduced as compared to a design with straightly severed ends of the optical fibers, which has a beneficial effect on the width of the component.

FIG. 7 shows an embodiment of an insert 12 having a deep V-groove 125 for accommodating the excitation light carrying optical fibers 6. The further, feed-back optical fiber 7 extends in groove 124 in parallel to the bundle of optical fibers 6.

FIG. 8 shows a further embodiment of insert 12 having a bore passage 126 for accommodating optical fibers 6 and a bore passage 127 for accommodating optical fiber 7. Optical fibers 6 extend in parallel to each other within insert 12 and produce a composed light spot 80 consisting of individual partially overlapping light spots of the individual optical fibers.

In all embodiments of FIGS. 5 to 8, insert 12 has a front face 128 which when the insert is installed in light exit head 1 forms a step, from where a free space extends to converter 8. The excitation light emerging from optical fibers 6 is superimposed on light spot 80.

As an alternative to the configuration of insert 12 shown in FIGS. 5 to 8, a rod lens (not shown) may be used as well, which may consist of a cylindrical rod having a flat polished light input face and a lens-shaped curved exit face for focusing the excitation light onto light spot 80 at converter 8. In this case, the optical fibers 6 carrying the excitation light are held together by a ferrule at the input end of the rod lens.

FIG. 9 is a perspective sectional view of one of optical fibers 6 comprising a fiber core 61 made of quartz glass of a higher refractive index, a fiber cladding 62 also made of quartz glass but of a lower refractive index, and a conductive coating 63. The conductive coating 63 may comprise a brittle material which in case of breakage of the glass fiber 61, 62 also breaks, thus allowing to signal a fiber breakage by interrupting a current path. Preferably, however, the conductive layer 63 is made of aluminum, which allows to signal fiber breakage and moreover protects the surface of the optical fiber particularly well. In this way, the risk of breakage can be further reduced. Other measures for this purpose include to coat the glass fiber with Tefzel® on polyimide, Tefzel® on aluminum, or Tefzel® on acrylate.

FIG. 10 is a cross-sectional view through one of feed cables 4 which extend between connectors 5 and manifold housing 2. Each of the optical fibers 6 is surrounded by an insulating plastic tube 41 which in turn is surrounded by a metallic protective tube 40. Thus, optical fibers 6 are fairly well protected against breakage. If nevertheless breakage should occur so that short-wave excitation light exits from the break point, then it can be assumed that the high-energy excitation light will not be capable to destroy the metallic protective tube to escape to the outside which would be dangerous.

FIGS. 11 to 14 show variations of a ferrule 50 for optical fiber 6 at the light input end at connector 5. Ferrule 50 is stepped comprising a connecting end portion 51 and a stop portion 52. The ferrule 50 is to be designed in a manner so that in case of misalignment no damage occurs to connector 5 between the input face of the optical fiber 6 and the exit face of the excitation light source. This issue can be addressed with a crimp sleeve in combination with an Al-coated optical fiber, or by a larger cladding diameter, or by multi-step gluing of the optical fiber. FIGS. 11 to 14 illustrate exemplary embodiments in which the optical fiber 6 is anchored in ferrule 50 by means of an adhesive layer 55.

In the exemplary embodiment of FIG. 11, the connecting end portion 51 of ferrule 50 is crimped at front end 51a, thereby displacing the adhesive layer 55 so that glue gap 55a disappears. In the exemplary embodiment of FIG. 12, an aperture stop 53 is secured to the end face of ferrule 50 in a manner so that only the fiber 61 remains uncovered. Aperture stop 53 tolerates the very intense excitation radiation. In the exemplary embodiment of FIG. 13, a ceramic socket 54 is used instead of the aperture stop, which closely surrounds the fiber cladding 62 of the optical fiber. Finally, the embodiment of FIG. 14 uses a thickened fiber cladding (as compared to the embodiments of FIGS. 11, 12, 13).

FIG. 15 shows a manifold housing 2 having a crescent-shaped inner space 20. Manifold housing 2 is arranged adjacent to a housing 59 that accommodates connectors 5 and light sources 60 as well as a light sensor 70. Feed cables 4 extend from of housing 59, each one with an insulating protective tube 41 (FIG. 10) inside, which in turn protects the corresponding optical fiber 6. The light input end 21 of crescent-shaped manifold housing 2 is considerably wider than the light exit end 22. At the light exit end 22, optical fibers 6 together with their protective tubes 41 are fed into connecting cable 3 which leads into light exit head 1. The amount of thermal expansion of the optical fiber 6 on the one hand and of the protective tube 41 on the other may differ considerably, so that a compensation in length is needed to avoid tensile stresses in the fiber. For this purpose, protective tube 41 may comprise two portions 41a, 41b having different diameters, which telescopically engage each other thus defining a displacement range of the protective tube 41, which provides for a thermal compensation in length between the optical fiber and the protective tube.

A compensation in length should also be allowed between the individual optical fibers in order to enable to compensate for movements of the fibers relative to each other which may occur when the conversion module moves. In case of the crescent-shaped interior 20 this means that the tubes 41 must be able to extend along different curves. The minimum and maximum curvatures are indicated at 41c and 41d.

Instead of extending in a curve as shown in FIG. 15, the protective tubes 41 may as well take a helical path in regions between the excitation light source and the light exit head. In this helical region, a possibility of yielding is provided by an increase or decrease of the pitch of the helix. This may be combined with an integrated displacement range for helical sections.

Another way of compensation in length is to have the protective tube and the optical fiber extend in a loop, wherein the length of the loop may change in case of a temperature change and the differential expansion between the optical fiber and protective tube may be compensated for by a displacement range of the protective tube.

FIG. 16 is a perspective sectional view of the front portion of the light exit head 1. Converter 8 is mounted on the cooled surface of a cooling element 14 which is arranged obliquely to the longitudinal extent of the light exit head 1 and is joined and in good thermal communication with the lower part 10 of light exit head 1. The optical fibers 6 extend along the longitudinal extension of light exit head 1 and define the predetermined beam direction of the excitation light in an angle to light spot 80. Because of heavy vibrations in vehicles, permanent mechanical stability is ensured by an undercut press connection. In addition, a heat conductive adhesive may be employed. The converter 8 is backed by a mirror 141 which is fixed to the main body 140 of cooling element 14 by means of a heat conductive adhesive (e.g. thermally conductive silver adhesive). For the purposes of heat dissipation, metal is preferred as the material of the light exit head 1 including the cooling element 14.

The excitation light of shorter wavelength emerging from optical fibers 6 skips step 128 and produces a round oval light spot 80 on converter 8, from which useful light of longer wavelengths, on average, is emanating in form of a light lobe 81, in an emission mode. If parallel headlight or spotlight is desired, the light spot 80 is restricted by an annular aperture stop 82 to avoid a yellow margin. The interior of light exit head 1 in which the converter 8 is placed, is covered by light exit sheet 9 (FIG. 3) which forms a window for the exiting useful light. Major fractions of the excitation light beam will penetrate into the converter material, besides, however, a reflection is formed on the surface of the converter 8, which is referred to as a Fresnel reflection, and which may be shielded by a light stop 93 on light exit sheet 9. Between the surface of cooling element 14 and the lower surface of light stop 93 a radiation trap is defined, optionally involving portions of the converter, which causes the reflected short-wave excitation light to fizzle out between the lower surface of light stop 93 and the upper surface of converter 8.

Figure 17:
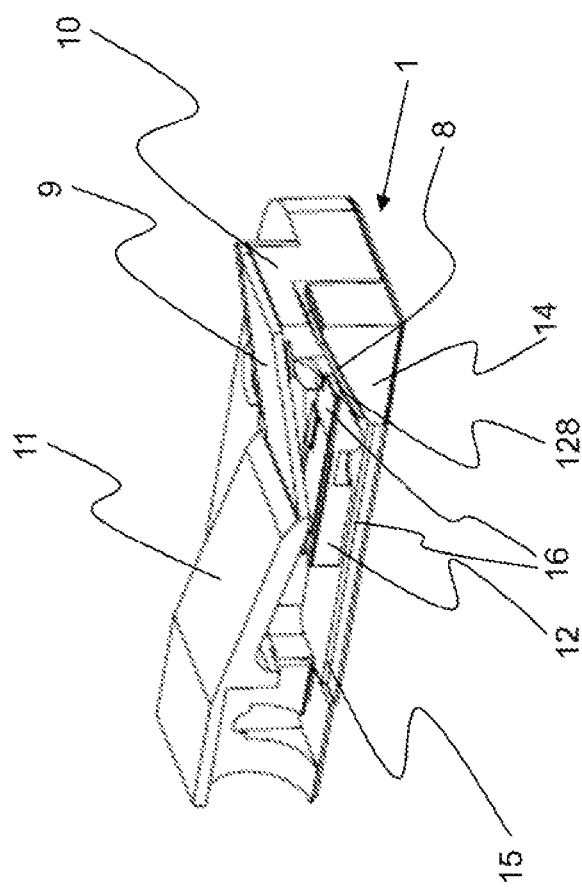
FIG. 17 is a sectional perspective view of another light exit head.

FIGS. 17, 18 are longitudinal sectional views through a further embodiment of light exit head 1. Parts similar to those of the embodiment of FIG. 16 are denoted by the same reference numerals. In this embodiment of the converter head, heat dissipation from converter 8 is improved as compared to the embodiment of FIG. 16. In fact, the triangularly-shaped lateral surface of cooling element 14 is again in surface contact with the highly conductive lower part 10 of light exit head 1, but in addition a heat-conducting body 15 is provided extending from the bottom surface of cooling element 14 to a heat sink, not shown, so that heat removal is not only accomplished via the housing of the light exit head but another heat conduction path is established. Thus, there are no longer major requirements imposed on the thermal conductivity of housing part 10, so that it may be made of stainless steel, for example. To provide for a particularly good thermal contact between cooling element 14 and the heat sink, not illustrated, the cooling element 14 may protrude slightly beyond the plane of the lower surface of the housing part, but only to an extent so that the heat conduction path 15 is able to compensate for the height difference. Cooling element 14 may be made of copper. In order to increase corrosion resistance, it may be provided with a Ni/Ag coating or another anti-corrosion layer.

In all embodiments of light exit head 1, the insert 12 has a front face 128 which forms a step across which the exiting beam of excitation light passes through the free space between front face 128 and the inclined upper surface of converter 8. In order to shift the light spot 80 closer to the center of converter 8 as compared to the embodiment of FIG. 16, insert 12 has an inclined surface below step 128, which matches the inclination of the converter 8.

To protect against escaping laser light in the event the light exit head should be damaged, laser protection plates 16 are additionally provided in the region of insert 12.

FIG. 18 shows the light exit head 1 in relation to a reflector 17 of an automotive headlight. Light spot 80 is located in the focal point of reflector 17. For adjusting this, a reflector reference surface 18 is defined on the light exit head. Another reference surface 19 serves to correctly install the light exit head. Furthermore, the radiation angle α of useful light between the boundary rays of light lobe 81 is indicated. A fraction of the useful light is trapped by blue-light stop 93, because in front thereof the useful light mixes with the Fresnel reflection resulting from reflection of the excitation light on the surface of the converter. This Fresnel reflection is in part absorbed by blue-light stop 93 and is in part reflected back to impinge on the converter surface and to be absorbed.

FIG. 19 shows the light exit sheet 9 in a plan view. In embodiments of the fiber-optic conversion module with integrated monitoring of the integrity of this light exit sheet 9, tempered glass is the preferred material for the light exit sheet. An anti-reflection layer is applied onto both surfaces of the glass, and additionally a conductive trace 91, e.g. in form of a sputtered ITO layer. Conductive trace 91 extends in parallel to the edges of light exit sheet 9 and terminates in two opposing solder pads 92 which serve to connect test wires.

If in the event of an accident the headlights breaks, the tempered light exit sheet 9 will entirely decay into small crumbs, some of which near the edge will leave the composite of the sheet, so that conductive trace 91 will be reliably interrupted. This can be detected by a monitoring circuit which is described below.

FIG. 20 shows a fiber breakage monitoring circuit. Shown are SMA connectors 5 and 57 of optical fibers 6 and 7, respectively, furthermore the conductive coatings 63 of these optical fibers and the light exit head 1 with cover sheet 9. The connectors 5 of optical fibers 6 each have associated therewith a respective laser diode 60 which injects the shorter wavelength excitation light into the respective optical fiber 6. Optical fiber 7 for optical monitoring has associated therewith a photodiode 70 which receives useful light as emitted by the converter via optical fiber 7. Electrically conductive coatings 63 are electrically connected together at a node 67. There is a power feed 65 to each of connectors 5 via series resistors 64, and a return path 66 via the conductive coating of optical fiber 7 and the associated connector. As long as current flows, there will be a voltage drop at each of resistors 64. If an optical fiber 6 breaks, the voltage at the associated resistor 64 will break down which can be detected for detecting a breakage of the corresponding optical fiber 6. The detection means are well known to skilled persons and therefore are not shown. If one of the optical fibers 6 should break, the light spot generated on the converter will become darker, which is detectable by photodiode 70. If such a break of the respective optical fiber 6 is found, at least the corresponding laser diode 60 is switched off. In this manner, damaging effects of the high-energy laser light are avoided.

Figure 21:
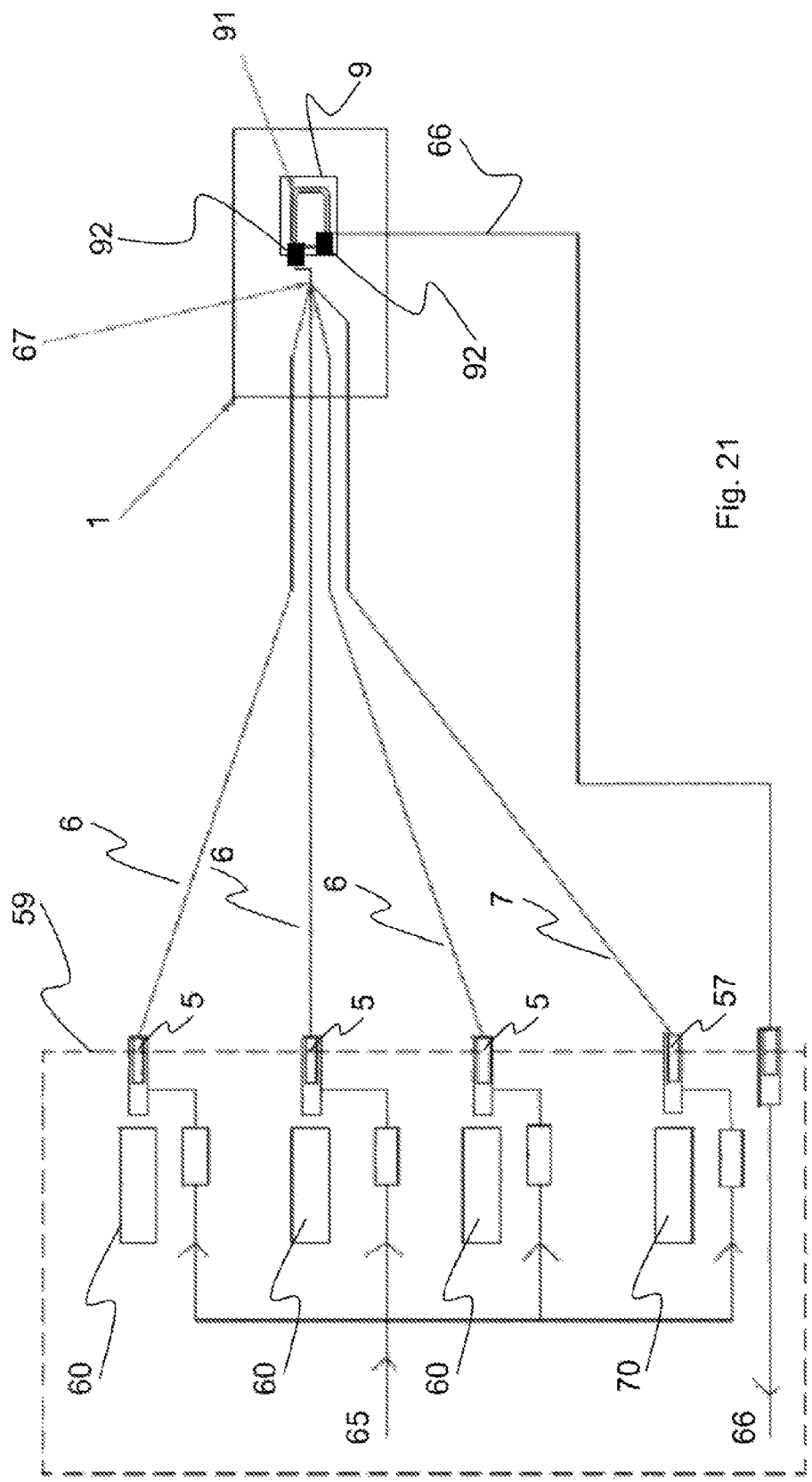
FIG. 21 illustrates a fiber breakage and cover sheet breakage monitoring circuit.

FIG. 21 shows the circuit of FIG. 20 with the enhancement of monitoring the cover sheet 9. The electrical return path from node 67 runs via conductive trace 91, so that a breaking of cover sheet 9 ultimately also leads to a shut-off of laser diodes 60.

In summary it can be stated that in the invention shorter wavelength excitation light is directed onto a converter 8 which is arranged inclined or in an angle with respect to the beam direction, with the angle of inclination relative to the beam direction being such that, on average, longer wavelength useful light is emitted in a radiation angle which is substantially outside the reflection angle of the Fresnel reflex, so that this Fresnel reflection can be trapped and neutralized by a light stop 93.

What is claimed is:

1. A fiber-optic conversion module, comprising:
   at least one optical fiber having a light input end adapted for being connected to an associated excitation light source and a light exit end adapted for emitting excitation light to a light spot in a predetermined beam direction;
   a converter arranged at an angle relative to the predetermined beam direction and used for converting shorter wavelength excitation light from the associated excitation light source into longer wavelength converted light and for emitting mixed useful light emanating from the light spot and spreading into a region of a useful radiation angle with a part of the excitation light being reflected at the converter into a region outside the useful radiation angle;
   a light exit head for supporting the light exit end of the at least one optical fiber and the converter;
   a cooling element for accommodating the converter in a heat conductive and mechanically stable connection with the light exit head; and
   an exit window for useful light provided with a light stop for excitation light directly reflected at the converter outside the region of the useful radiation angle of the useful light.

2. The fiber-optic conversion module as claimed in claim 1, wherein the exit window for useful light is defined by a cover sheet of the light exit head, the cover sheet comprising the light stop, which together with the converter forms a light trap for collecting the excitation light directly reflected at the converter.

3. The fiber-optic conversion module as claimed in claim 1, further comprising a further optical fiber provided for optically monitoring the converter, the further optical fiber having a second light input end near the light exit end of the at least one optical fiber and a second light exit end near the light input end of the at least one optical fiber, wherein the second light exit end is connectable to a photodetector.

4. The fiber-optic conversion module as claimed in claim 1, wherein the at least one optical fiber comprises two or more optical fibers supported in a manifold housing at least partly forming a curve and extending along a rectilinear or slightly curved line toward a light exit concentration point from which the exiting excitation light reaches the light spot.

5. The fiber-optic conversion module as claimed in claim 1, wherein the at least one optical fiber is enclosed by at least one protective tube and/or layer.

6. The fiber-optic conversion module as claimed in claim 5, wherein the protective tube and/or layer has two sections that engage telescopically into and above each other to provide for a compensation in length between the optical fiber and the protective tube.

7. The fiber-optic conversion module as claimed in claim 4, wherein the manifold housing encloses a crescent-shaped inner space in which the two or more optical fibers extend in a curve between the associated excitation light source and an optical fiber connecting cable to the light exit head.

8. The fiber-optic conversion module as claimed in claim 4, wherein, between the associated excitation light source and the light exit head, the two or more optical fibers partially extend along a helical line or form a loop.

9. The fiber-optic conversion module as claimed in claim 4, wherein the two or more optical fibers comprise three optical fibers, each of which is individually surrounded by a metallic protective tube between a respective associated connector and the manifold housing, and which are combined in a shared metallic protective tube between the manifold housing and the light exit head.

10. The fiber-optic conversion module as claimed in claim 9, wherein the further optical fiber is surrounded by a further metallic protective tube between a further connector and the manifold housing and extends in the shared metallic protective tube together with the three optical fibers between the manifold housing and the light exit head.

11. The fiber-optic conversion module as claimed in claim 1, wherein the at least one optical fiber has a quartz glass fiber core, a quartz glass fiber cladding, and a coating comprising two layers of different plastics or of plastics and metal.

12. The fiber-optic conversion module as claimed in claim 1, wherein, at the light input end, the at least one optical fiber has a ferrule with a connecting end portion provided with a crimping region surrounding the connecting end portion and/or with a protective aperture stop covering an end face of the ferrule and/or with a ceramic socket surrounding the fiber end at the connecting end portion, or wherein, in the region of the ferrule, the fiber cladding of the at least one optical fiber is of such a thickness that in case of misalignment of the connector with respect to the associated excitation light source the excitation light is still safely trapped on the ferrule end face.

13. The fiber-optic conversion module as claimed in claim 3, wherein the light exit head comprises a lower part, an upper part, and an insert, which supports the ends of the at least one optical fiber and the further optical fiber proximal to the converter so as to form a light exit concentration point for delivering the excitation light to the light spot.

14. The fiber-optic conversion module as claimed in claim 1, wherein the cooling element of the light exit head is connected to a heat sink via a heat conduction path.

15. The fiber-optic conversion module as claimed in claim 1, wherein the light exit head has a housing step at the light exit end of the optical fibers facing an inclined surface of the cooling element on which the converter is attached.

* * * * *